United States Patent
Zhang et al.

(10) Patent No.: US 10,567,994 B2
(45) Date of Patent: *Feb. 18, 2020

(54) METHOD AND DEVICE FOR TRANSMITTING DATA

(71) Applicant: HUAWEI TECHNOLOGIES CO., LTD., Shenzhen, Guangdong (CN)

(72) Inventors: Gongzheng Zhang, Hangzhou (CN); Yourui HuangFu, Hangzhou (CN); Lingchen Huang, Hangzhou (CN); Ying Chen, Hangzhou (CN); Yunfei Qiao, Hangzhou (CN); Rong Li, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/561,027

(22) Filed: Sep. 5, 2019

(65) Prior Publication Data

US 2019/0394674 A1 Dec. 26, 2019

Related U.S. Application Data

(63) Continuation of application No. 16/164,833, filed on Oct. 19, 2018, now Pat. No. 10,440,606, which is a
(Continued)

(30) Foreign Application Priority Data

Mar. 25, 2017 (CN) .......................... 2017 1 0185302

(51) Int. Cl.
*H04W 28/04* (2009.01)
*H04L 1/00* (2006.01)

(52) U.S. Cl.
CPC ........... *H04W 28/04* (2013.01); *H04L 1/0013* (2013.01); *H04L 1/0068* (2013.01); *H04L 1/0071* (2013.01)

(58) Field of Classification Search
CPC .... H04W 28/04; H04L 1/0013; H04L 1/0071; H04L 1/0068; H04L 1/0057; H04L 1/0067
See application file for complete search history.

(56) References Cited

U.S. PATENT DOCUMENTS

| 10,171,204 B2 * | 1/2019 | Wu ....................... H04L 1/0068 |
| 2009/0067543 A1 * | 3/2009 | Hsiao ................... H04B 7/0617 375/298 |

(Continued)

FOREIGN PATENT DOCUMENTS

| CA | 2972832 A1 | 7/2015 |
| CN | 102325000 A | 1/2012 |

(Continued)

OTHER PUBLICATIONS

Mediatek, INC, Polar Code Size and Rate matching design for NR Control Channel, 3GPP TSG RAN WG1 RAN1 #88 Meeting, R1-1702735, XP051221575, Feb. 2017, 8 pages (Year: 2017).*

(Continued)

*Primary Examiner* — Mounir Moutaouakil
(74) *Attorney, Agent, or Firm* — Huawei Technologies Co., Ltd.

(57) ABSTRACT

Embodiments of the application provide a method for transmitting data in a wireless communication network. A device of the network receives a bit sequence of K information bits. The device polar codes the bit sequence to obtain a first encoded sequence, wherein a length of the first encoded sequence is N, and N is greater than or equal to K. The device block interleaves the first encoded sequence to obtain an interleaved bit sequence. The device determines a trans-
(Continued)

---

A network device determines a transmission code rate R, where R=K/M, K is an information bit length, M is a target code length, and K and M are positive integers — 210

If the transmission code rate R is greater than or equal to a first code rate threshold, the network device determines to use a shortening mode for a bit sequence whose length is N, or if the transmission code rate R is less than a first code rate threshold, the network device determines to use a puncturing mode for a bit sequence whose length is N, where N is a mother code length, and N is a positive integer — 220

The network device performs polar coding on the bit sequence whose length is N, to obtain a first encoded sequence whose length is N, and the network device shortens or punctures the first encoded sequence, to obtain a second encoded sequence whose length is M — 230 mission code rate R. When the transmission code rate R is less than the code rate threshold, the device outputs a second bit sequence. The length of the second bit sequence is M, M is smaller than N. The second bit sequence is punctured from the interleaved bit sequence by removing (N−M) bits from beginning of the interleaved bit sequence.

30 Claims, 8 Drawing Sheets

Related U.S. Application Data continuation of application No. PCT/CN2018/080395, filed on Mar. 24, 2018.

(56) References Cited

U.S. PATENT DOCUMENTS

| | | | |
|---|---|---|---|
| 2014/0173376 A1* | 6/2014 | Jeong | H03M 13/2906 714/755 |
| 2014/0208183 A1* | 7/2014 | Mahdavifar | H03M 13/296 714/755 |
| 2015/0077277 A1* | 3/2015 | Alhussien | H03M 13/618 341/67 |
| 2015/0236715 A1* | 8/2015 | Alhussien | H03M 7/40 341/67 |
| 2015/0333769 A1* | 11/2015 | Jeong | H03M 13/6362 714/790 |
| 2016/0239975 A1* | 8/2016 | Liu | G06T 7/80 |
| 2016/0269050 A1* | 9/2016 | Shen | H03M 13/13 |
| 2016/0285479 A1* | 9/2016 | El-Khamy | H03M 13/6368 |
| 2016/0380763 A1* | 12/2016 | Ahn | H04W 12/02 380/270 |
| 2017/0019214 A1 | 1/2017 | Shen et al. | |
| 2017/0047947 A1* | 2/2017 | Hong | H03M 13/2906 |
| 2017/0250779 A1* | 8/2017 | Murakami | H04L 1/0003 |
| 2018/0199350 A1* | 7/2018 | John Wilson | H04L 1/0041 |
| 2018/0367239 A1* | 12/2018 | Jang | H04L 1/0013 |

FOREIGN PATENT DOCUMENTS

| | | |
|---|---|---|
| CN | 103888151 A | 6/2014 |
| CN | 105049061 A | 11/2015 |
| CN | 105637767 A | 6/2016 |
| CN | 105680988 A | 6/2016 |
| CN | 105897279 A | 8/2016 |
| CN | 105900365 A | 8/2016 |
| CN | 106100794 A | 11/2016 |
| CN | 106130690 A | 11/2016 |
| CN | 106161012 A | 11/2016 |
| CN | 106230489 A | 12/2016 |
| CN | 107342845 A | 11/2017 |
| EP | 3098970 A1 | 11/2016 |

OTHER PUBLICATIONS

ZTE, Polar Codes Construction and Rate Matching Scheme, 3GPP TSG RAN WG1 Meeting #88, R1-1707183, XP051262938, May 2017, 13 pages (Year: 2017).*

Bioglio et al, Low Complexity Puncturing and Shortening of Polar codes, Arxiv.org, Cornell University Library, XP080750896, 2017, 6 pages (Year: 2017).*

Mediatek, INC, Polar Code Design Features for Control Channels, 3GPP TSG RAN WG1 AH_NR Meeting, R1-1700168, XP051207710, Jan. 2017, 8 pages (Year: 2017).*

R1-1702735 MediaTek Inc., "Polar Code Size and Rate-Matching Design for NR Control Channels", 3GPP TSG RAN WG1 RAN1 #88 Meeting, Athens, Greece, Feb. 13-17, 2017, total 8 pages.

R1-1701602 Zte et al.,"Rate Matching of Polar Codes for eMBB", 3GPP TSG RAN WG1 Meeting #88, Athens, Greece Feb. 13-17, 2017, total 20 pages.

K. Niu, K. Chen, and J.-R. Lin, "Beyond turbo codes: rate-compatible punctured polar codes," IEEE ICC, 2013, pp. 3423-3427.

R. Wang and R. Liu, "A novel puncturing scheme for polar codes," IEEE Comm. Lett., vol. 18, No. 12, pp. 2081-2084, Dec. 2014.

* cited by examiner

METHOD AND DEVICE FOR TRANSMITTING DATA

CROSS-REFERENCE TO RELATED APPLICATIONS

This application is a continuation of U.S. patent application Ser. No. 16/164,833, filed on Oct. 19, 2018, which is a continuation of International Application No. PCT/CN2018/080395, filed on Mar. 24, 2018. The International Application claims priority to Chinese Patent Application No. 201710185302.4, filed on Mar. 25, 2017. All of the aforementioned patent applications are hereby incorporated by reference in their entireties.

TECHNICAL FIELD

Embodiments disclosed herein relate to the field of communication technologies, and in particular, to a method and device for transmitting data.

BACKGROUND

Channel encoding is used in communication systems to improve data transmission reliability, so as to ensure communication quality. Polar codes, proposed by Professor Arikan of Turkey, are the first kind of codes that are theoretically proven to be able to achieve the Shannon capacity and having low encoding and decoding complexity.

A polar code is a linear block code. An encoding matrix of the polar code is $G_N$, which is an N×N matrix.

An encoding process for generating a polar code $x_1^N$ is:

$$x_1^N = u_1^N G_N$$

where $u_1^N = (u_1, u_2, \ldots, u_N)$ is a binary row vector having a length of N bits (N is also called a mother code length), $G_N$ is the coding matrix, and $G_N = F_2^{\otimes(log_2(N))}$. $F_2^{\otimes(log_2(N))}$ is a Kronecker product of $log_2 N$ matrices $F_2$, and the matrix $F_2$ is:

$$F_2 = \begin{bmatrix} 1 & 0 \\ 1 & 1 \end{bmatrix}$$

In the encoding process of the polar code, some bits in the row vector $u_1^N$ are used to carry information, and these bits are referred to as information bits. An index set of these bits is represented by A. Other bits are set to a fixed value that is pre-agreed upon between a receiving end and a transmitting end of the polar code, and these bits are referred to as fixed bits or frozen bits. An index set of the fixed bits or frozen bits is represented by $A^c$, which is a complement set of A.

The encoding process of the polar code is equivalent to $$X_1^N = u_A G_N(A) \oplus u_{A^c} G_N(A^c).$$

Herein, $G_N(A)$ is a submatrix formed by rows in the $G_N$ that correspond to indexes in the set A, and $G_N(A^c)$ is a submatrix formed by rows in the $G_N$ that correspond to indexes in the set $A^c$. $u_A$ is an information bit set of the $u1^N$, and the number of the information bits in the $u_A$ is K. $u_{A^c}$ is a frozen bit set of the $u_1^N$, and the number of the frozen bits in the $u_{A^c}$ is N−K.

The frozen bits are known bits. Value of the frozen bits is normally set to 0, but the value of the frozen bits may be randomly set, provided that the receiving end and the transmitting end of the polar code have pre-agreed on the value of the frozen bits. When the frozen bits are set to 0, a polar code encoding output may be simplified as $x_1^N = u_A G_N(A)$, in which $G_N(A)$ is a K×N matrix.

A process of constructing a polar code is a process of selecting the set A, and the selection of the set A determines the performance of the polar code. The process of constructing the polar code normally includes: determining, based on a mother code length N, that a total of N polarized channels exist, where each of the polarized channels corresponds to one row in an encoding matrix, respectively; calculating a reliability of each of the polarized channels; forming the information bit index set A using indexes of first K polarized channels with relatively high reliabilities, and forming the frozen bit index set $A^c$ using indexes of the remaining (N−K) polarized channels. The set A determines bit positions of the information bits in $x_1^N$, and the set $A^c$ determines bit positions of the frozen bits in $x_1^N$.

It can be learned from the encoding matrix that a code length of an original polar code (mother code) is an integer power of 2. In practical applications, however, length of a polar code need to be set to any code length, and this is achieved by a process called rate matching.

In current technology, solutions of the rate matching include puncturing and shortening. This means that, in encoding, when a length of the mother code is larger than a length of a target code, the target code is obtained by puncturing or shortening the mother code, and during decoding, the length of the mother code is restored from the target code by padding. In the situations when the mother code includes a relatively large quantity of information bits, rate matching by directly puncturing or shortening the mother code may lead to information loss during decoding.

SUMMARY

Embodiments of the present application provide a rate matching method and device, in order to reduce performance losses in puncturing and shortening processes of the prior art.

According to a first aspect, embodiments of this application provide method for transmitting data in a wireless communication network, including: receiving, by a device of the network, a bit sequence, wherein the bit sequence comprises K information bits, and K is a positive integer; polar coding, by the device, the bit sequence to obtain a first encoded sequence, wherein a length of the first encoded sequence is N, N is greater than or equal to K, and N is an integer power of 2; block interleaving, by the device, the first encoded sequence, to obtain an interleaved bit sequence; determining, by the device, a transmission code rate R; when the transmission code rate R is less than the code rate threshold, outputting, by the device, a second bit sequence, wherein a length of the second bit sequence is M, M is a positive integer smaller than N, wherein the second bit sequence is punctured from the interleaved bit sequence by removing (N−M) bits from beginning of the interleaved bit sequence, and wherein R=K÷M; and transmitting, by the device, the second bit sequence.

According to a second aspect, embodiments of this application provide a device in a communication system, comprising: a receiver, a transmitter, a processor and a memory storing program instructions for execution by the processor; wherein the receiver is configured to receive a bit sequence, wherein the bit sequence comprises K information bits, and K is a positive integer; wherein, by executing the program instructions, the processor is configured to: polar code the bit sequence to obtain a first encoded sequence, wherein a length of the first encoded sequence is N, N is greater than or equal to K, and N is an integer power of 2; block interleave the first encoded sequence, to obtain an interleaved bit sequence; determine a transmission code rate R; and when the transmission code rate R is less than the code rate threshold, output a second bit sequence, wherein a length of the second bit sequence is M, M is a positive integer smaller than N, wherein the second bit sequence is punctured from the interleaved bit sequence by removing (N−M) bits from beginning of the interleaved bit sequence, and wherein R=K÷M; and wherein the transmitter is configured to transmit the second bit sequence.

According to a third aspect, embodiments of this application provide a non-transitory computer readable medium storing program codes thereon for execution by a processor in a communication device, wherein the program codes comprise instructions for: receiving a bit sequence, wherein the bit sequence comprises K information bits, and K is a positive integer; polar coding the bit sequence to obtain a first encoded sequence, wherein a length of the first encoded sequence is N, N is greater than or equal to K, and N is an integer power of 2; block interleaving the first encoded sequence, to obtain an interleaved bit sequence; determining a transmission code rate R; when the transmission code rate R is less than the code rate threshold, outputting a second bit sequence, wherein a length of the second bit sequence is M, M is a positive integer smaller than N, wherein the second bit sequence is punctured from the interleaved bit sequence by removing (N−M) bits from beginning of the interleaved bit sequence, and wherein R=K÷M; and transmitting the second bit sequence.

DESCRIPTION OF EMBODIMENTS

The following describes specific embodiments of this application with reference to the accompanying drawings.

Figure 1:
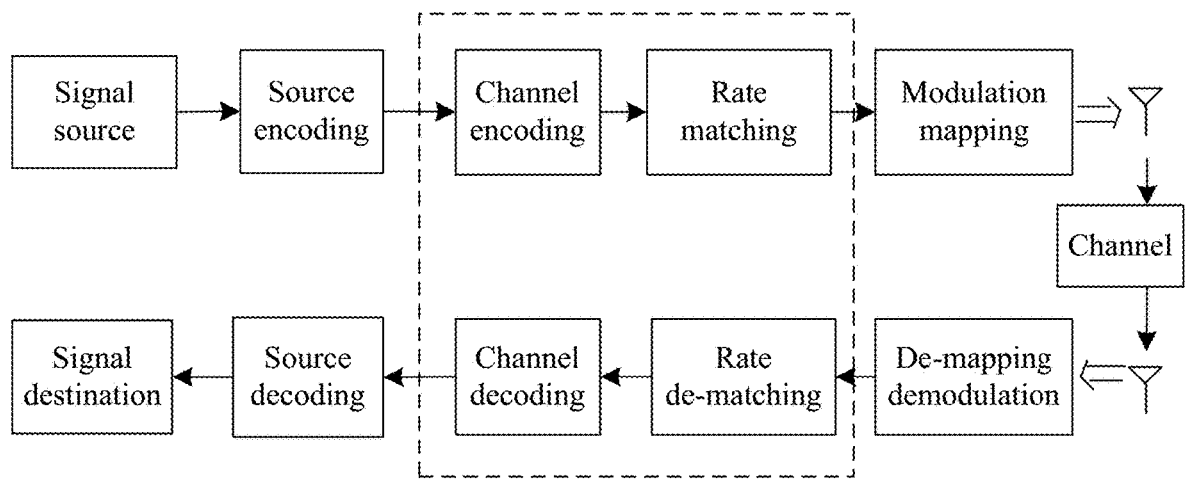
FIG. 1 is a schematic diagram of a basic procedure of wireless communication.

FIG. 1 shows a basic procedure of wireless communication. Assuming that communication signals are transmitted from a transmitting device (referred to as transmitting end hereinafter) to a receiving device (referred as receiving end hereinafter). At the transmitting end, a signal from a signal source is source encoded, channel encoded, rate matched, modulation mapped, and then transmitted to the receiving end. At the receiving end, after de-mapping demodulation, rate de-matching, channel decoding, and source decoding, the signal is output to a signal destination. In channel encoding and channel decoding, the polar coding process as described above can be used. Because a code length of an original polar code (mother code) is an integer power of 2, in practical applications, the code length may need to be adjusted to a different code length. This can be achieved through rate matching. At the transmitting end, the rate matching is performed after the channel encoding, to achieve any target code length. At the receiving end, a rate de-matching is performed before channel decoding, to restore the polar code to its original length. It should be noted that the basic procedure of wireless communication as shown in FIG. 1 may further include other procedures (such as precoding and interleaving), which are not described herein.

Figure 2:
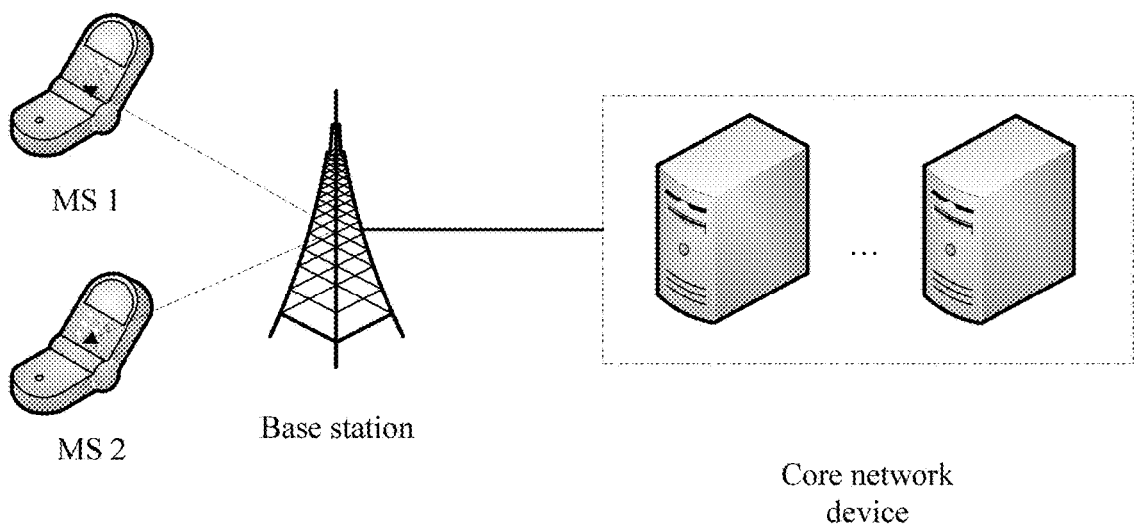
FIG. 2 is a schematic diagram of an application scenario of the data transmission method according to an embodiment of this application.

The embodiments of this application can be applied to a wireless communication system. The wireless communications system includes multiple cells. Each cell includes at least a base station (BS). The base station provides communication services for a plurality of mobile stations (MSs). The base station is connected to core network equipment, as shown in FIG. 2.

Examples of wireless communication systems or schemes, in which the embodiments of this application may be applied, include: narrowband Internet of Things (NB-IoT), Global System for Mobile Communications (GSM), Enhanced Data rates for GSM Evolution (EDGE), Wideband Code Division Multiple Access (WCDMA), Code Division Multiple Access 2000 (CDMA2000), Time Division-Synchronous Code Division Multiple Access (TD-SCDMA), Long Term Evolution (LTE), and three main application scenarios of the next-generation (5G) mobile communication systems: enhanced mobile broadband (eMBB), ultra-Reliable and low-latency communication (URLLC), and enhanced Machine Type Communication (eMTC).

In the embodiments of this application, the base station is an apparatus that is deployed in a radio access network and that provides a wireless communication function for an MS. The base station may include various forms of macro base stations, micro base stations (also referred to as small cells), relay nodes, access points, and the like. In systems using different radio access technologies, a device having a base station function may have different names. For example, the base station may be referred to as an evolved NodeB (eNB or eNodeB) in an LTE system, a NodeB in a 3rd generation (3G) system, or the like. For ease of description, in all the embodiments of this application, all the foregoing apparatuses that provide the wireless communications function for the MS are collectively referred to as a network device or a base station or a BS.

The MS in the embodiments of this application may include various handheld devices, in-vehicle devices, wearable devices, or computing devices that have a wireless communication function, or other processing devices connected to a wireless modem. The MS may also be referred to as a terminal, and may further include a subscriber unit, a cellular phone, a smartphone, a wireless data card, a personal digital assistant (PDA) computer, a tablet computer, a wireless modem, a handheld device, a laptop computer, a machine type communication (MTC) terminal, and the like. For ease of description, in all the embodiments of this application, the foregoing mentioned devices are collectively referred to as the MS.

Currently, polar coding methods include conventional Arikan polar coding and checked polar coding. The checked polar coding includes cyclic redundancy check (CRC) concatenated polar coding, parity check (PC) concatenated polar coding, and PC-aided CRC concatenated polar coding.

In CRC concatenated polar coding, firstly a CRC is performed on an information bit set, and then polar encode is performed. In PC concatenated polar coding, a PC is firstly performed on an information bit set, and then polar encode is performed. In PC-aided CRC concatenated polar coding, a PC-aided CRC is performed on an information bit set, and then polar encode is performed.

Polar coding and decoding methods and polar coding and decoding apparatuses in embodiments of this application may use the conventional polar coding, CRC-aided (CA) polar coding, or the PC polar coding scheme.

Figure 3:
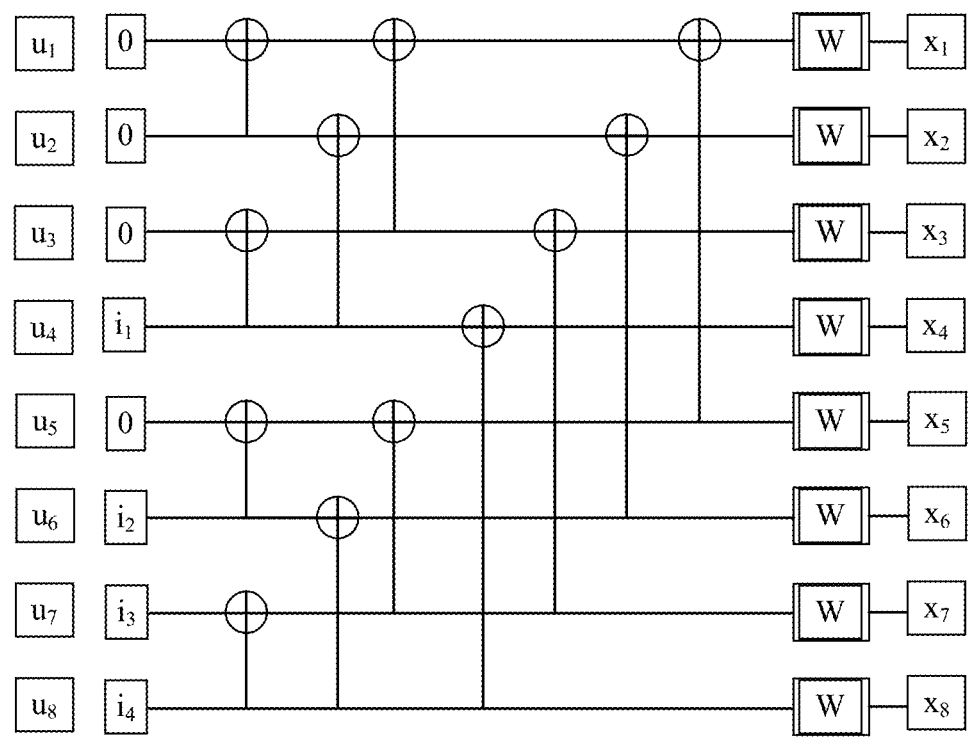
FIG. 3 is a construction diagram of an Arikan polar code.

These check manners mentioned above applied in the polar coding leads to a performance improvement during polar encoding. An example of the conventional Arikan polar coding is illustrated in FIG. 3. $\{u_1, u_2, u_3, u_5\}$ is a frozen bit set, $\{u_4, u_6, u_7, u_8\}$ is an information bit set. The Arikan polar coding is to encode the four information bits in an information vector into eight coded bits.

Figure 4:
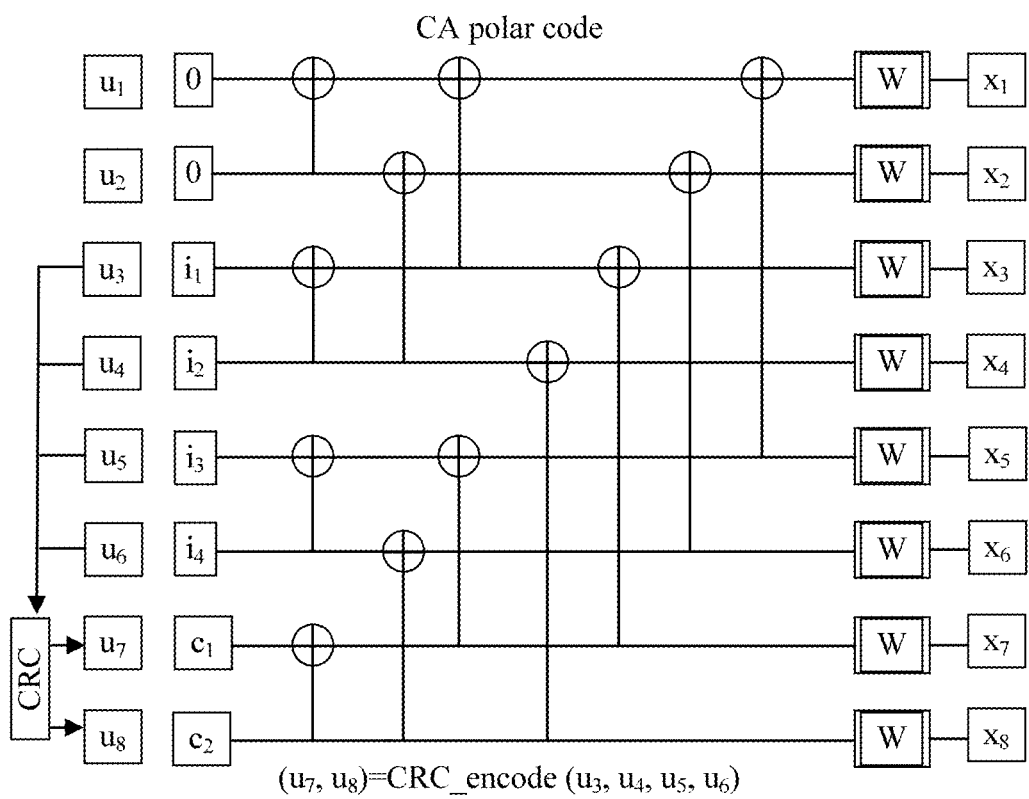
FIG. 4 is a construction diagram of a cyclic redundancy code-aided (CA) polar code.

An example of the CA polar coding is illustrated in FIG. 4. $\{u_1, u_2\}$ is a frozen bit set, $\{u_3, u_4, u_5, u_6\}$ is an information bit set, and $\{u_7, u_8\}$ is a CRC bit set. Values of $\{u_7, u_8\}$ are obtained by performing CRC on $\{u_3, u_4, u_5, u_6\}$.

For the CA polar coding, a CRC-Aided successive cancellation list (CA-SCL) decoding algorithm is used. The CA-SCL decoding algorithm uses a CRC check to select, as a decoded output, a path that a CRC passes from candidate paths of an SCL decoded output.

Figure 5:
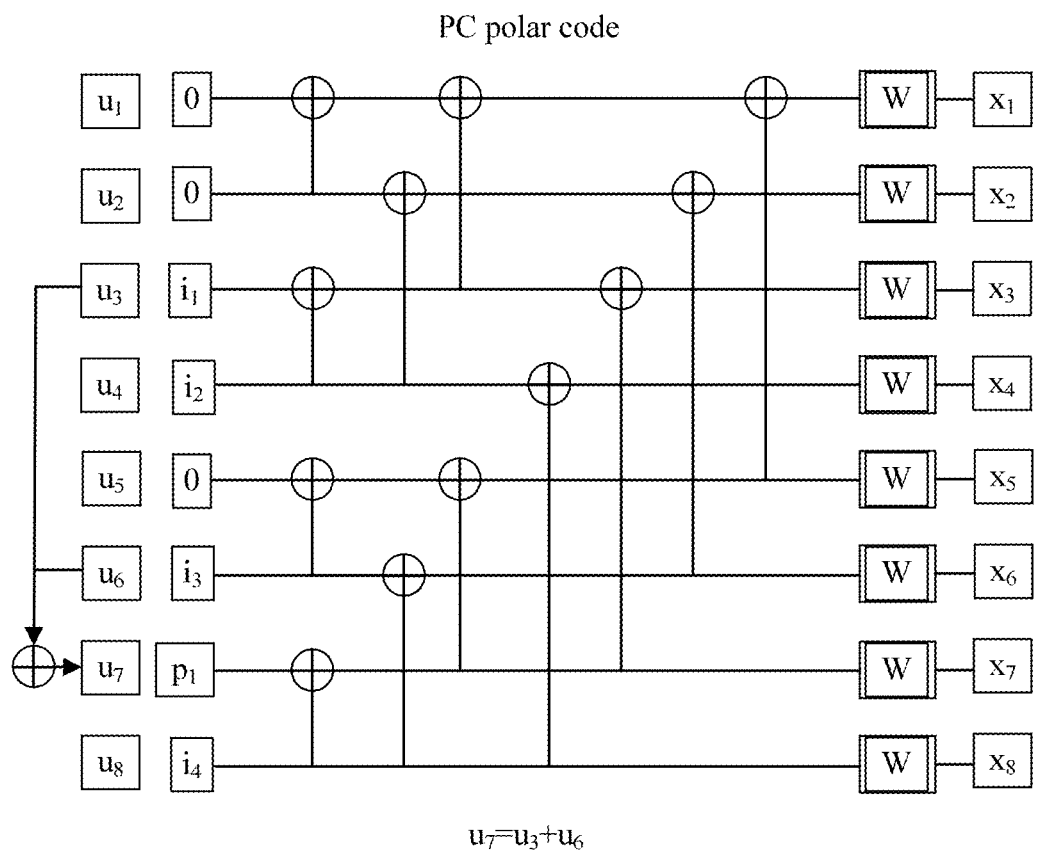
FIG. 5 is a construction diagram of a parity check (PC) polar code.

An example of the PC polar coding is illustrated in FIG. 5. $\{u_1, u_2, u_5\}$ is a frozen bit set, $\{u_3, u_4, u_6, u_7\}$ is an information bit set, and $\{u_7\}$ is a PC frozen bit set. A value of $\{u_7\}$ is obtained by performing an exclusive OR operation on $\{u_3, u_6\}$.

Figure 6:
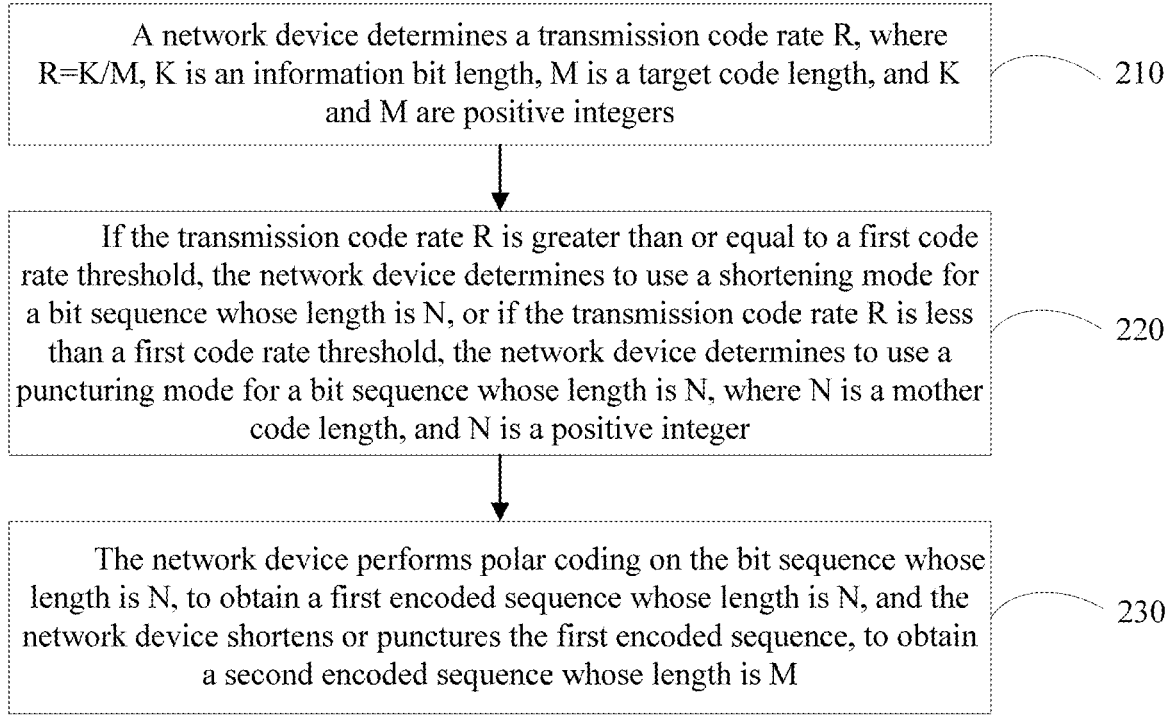
FIG. 6 is a flowchart of a method according to an embodiment of this application.

Embodiments of this application provide a rate matching method, and the rate matching method can be used by a network device such as a base station. FIG. 6 is a flowchart of the rate matching method, and specific steps are described below.

Step 210: A bit sequence has a length of N bits, in which K bits are information bits. Before transmission, the length of the bit sequence needs to be reduced from N to M. The network device determines a transmission code rate R, where R=K÷M, K is a length of an information bit set, M is a length of a target code, and K and M are positive integers.

Step 220: A manner of reducing the bit sequence length is determined. If the transmission code rate R is greater than or equal to a code rate threshold, the network device determines to reduce the length N by shortening. If the transmission code rate R is less than a code rate threshold, the network device determines to reduce the length N by puncturing.

Step 230: The network device polar encodes the bit sequence, to obtain a first encoded sequence whose length is also N, and the network device shortens or punctures the first encoded sequence, to obtain a second encoded sequence, wherein a length of the second encoded sequence is M.

According to the rate matching method of steps 210 to 230, the network device can compare a transmission rate with the code rate threshold, flexibly select the puncturing or shortening, and avoid a performance loss caused in a puncturing or shortening process.

Figure 9:
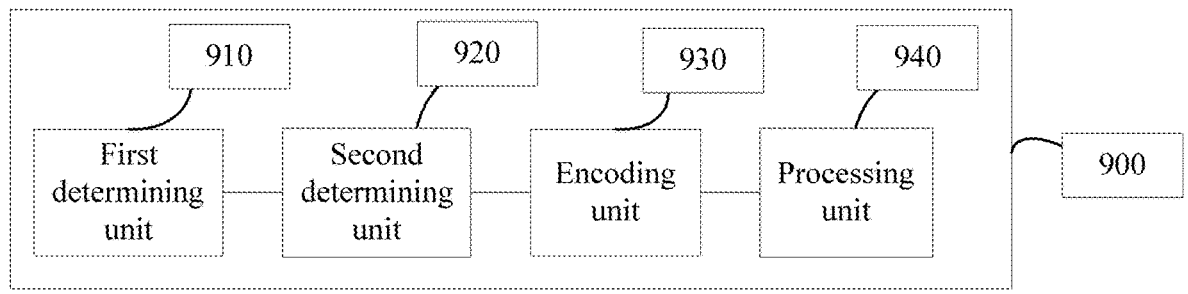
FIG. 9 is a functional diagram of a device according to an embodiment of this application.

The processes of steps 210 to 230 may be performed by a device 900 shown in FIG. 9. A first determining unit 910 is configured to perform step 210, a second determining unit 920 is configured to perform step 220, an encoding unit 930 is configured to perform an encoding process in step 230, and a processing unit 940 is configured to perform a shortening or puncturing process in step 230. The device 900 may be a base station (BS) or a mobile station (MS), and the device may alternatively be an application-specific integrated circuit (ASIC), a digital signal processor (DSP), a system-on-a-chip, or software that implements related functions. If the device 900 is the ASIC, the DSP, or a system-on-a-chip, the components 910 to 940 may be circuits or parts. If the device 900 is a software stored on a storage medium, the components 910 to 940 may be program codes.

In addition, in step 230, the network device has already known an order of reliabilities of polarization channels corresponding to the bit sequence, and the order of reliabilities may be calculated through density evolution, Gaussian approximation, linear fitting, or the like.

Alternatively, the rate matching method may only include steps 210 and 230, and comparing the transmission code rate with the code rate threshold is skipped. This does not affect polar coding or a shortening or puncturing operation process in step 230.

Specifically, step 220 includes two implementation manners: shortening and puncturing. These two manners are described in details below.

Shortening

If the transmission code rate R is greater than or equal to the code rate threshold, the network device determines to use the shortening manner for reducing the bit sequence length N. The shortening manner specifically includes: dividing, by the network device, the bit sequence into S1 bit groups that are equal in length, where S1 is a positive integer; and removing, by the network device, N1 bit groups from the S1 bit groups. If, after removing the N1 bit groups, the length of the remaining bit sequence is still larger than M, further removing, by the network device, N2 bits from the remaining bit sequence, where $$N1 = \left\lfloor \frac{N-M}{N/S1} \right\rfloor,$$

and N2=N−M−N1*(N÷S1).

Figure 7:
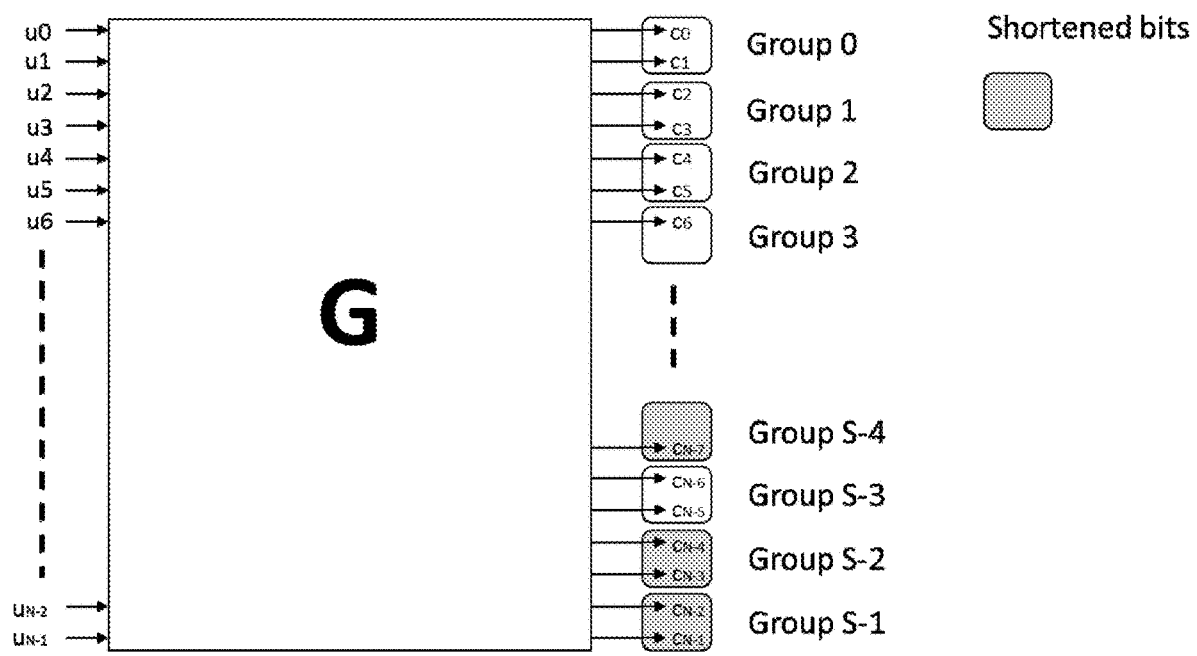
FIG. 7 is a schematic diagram of shortening according to an embodiment of this application.

In an example as shown in FIG. 7, the bit sequence, whose length is N, is divided into S equal-length bit groups, and each bit group includes two bits. Bits to be removed N−M=5, and N÷S=2. Therefore, N1=2 (2 groups) and N2=1 (1 bit). The shortening operation includes removing a group S−1, a group S−2, and a bit $C_{n-7}$ in a group S−4.

Puncturing

If the transmission code rate R is less than the code rate threshold, the network device determines to use the puncturing manner for reducing the bit sequence length N. The puncturing manner specifically includes: dividing, by the network device, the bit sequence into S2 equal-length bit groups, where S2 is a positive integer; and removing, by the network device, L1 bit groups from the S2 bit groups. If, after removing the L1 bit groups, the length of the remaining bit sequence is still larger than M, further removing, by the network device, L2 bits from the remaining bit sequence, where $$L1 = \left\lfloor \frac{N-M}{N/S2} \right\rfloor,$$

and L2=N−M−L1*(N÷S2).

Figure 8:
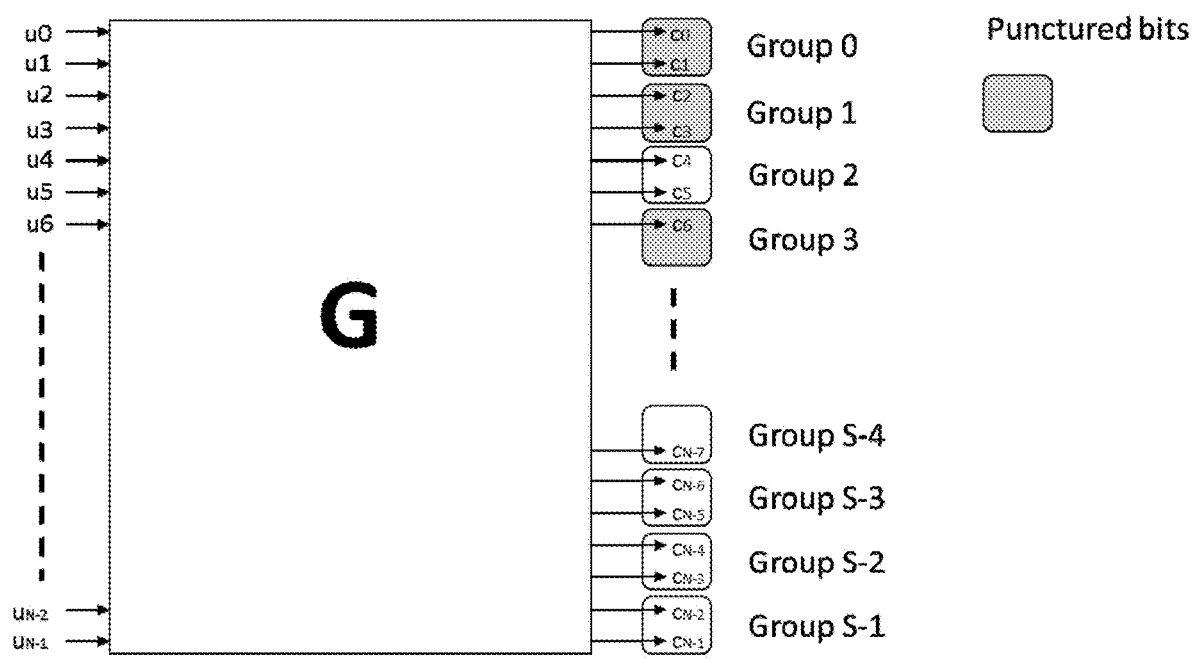
FIG. 8 is a schematic diagram of puncturing according to an embodiment of this application.

In an example as shown in FIG. 8, the bit sequence, whose length is N, is divided into S equal-length bit groups, and each bit group includes two bits. Bits to be removed N−M=5 and N÷S=2. Therefore, L1=2 (2 groups) and L2=1 (1 bit). The puncturing operation includes removing a group 0, a group 1, and a bit $C_6$ in a group 3.

It should be noted that a value of S1 in the shortening manner may be the same as or different from that of S2 in the puncturing manner. The values of S1 and S2 may be 16, 32, 64, or the like. In one case, the values of S1 and S2 may be 1. In this case, a value of N1 is 0, and a value of N2 is not 0. The network device performs a rate matching operation on the bit group, and shortens or punctures N2 bits. In another case, the values of S1 and S2 may be N.

In this case, a value of N1 is not 0, a value of N2 is 0, and the network device performs a rate matching operation on N bit groups, and shortens or punctures N1 bit groups.

It should be noted that, in both manners, in addition to determining the N1 or L1 shortened or punctured complete groups, the network device further determines locations of the remaining N2 or L2 bits. The locations of the shortened or punctured bit groups and the locations of the remaining N2 or L2 bits to be removed may be determined by using the following implementations.

Implementation 1: sorting of Polarization Weight (PW) values

A sorting sequence of the PW values is a polar code reliability sorting sequence, and is used for information bit selection. During the rate matching operation, the sequence may be used for a puncturing or shortening operation on the complete groups and remaining bits after the groups are removed. For example, a PW sequence may be used to puncture the complete group, and a reversed PW sequence may be used to shorten the complete group. The PW sequence may be used to puncture a bit in the group, and the reversed PW sequence may be used to shorten a bit in the group. When a group quantity S has different values, sorting sequences obtained in ascending order of PWs, that is, ascending order of reliability are as follows:

when S=16, PW=[0, 1, 2, 4, 8, 3, 5, 6, 9, 10, 12, 7, 11, 13, 14, 15];

when S=32, PW=[0, 1, 2, 4, 8, 16, 3, 5, 6, 9, 10, 17, 12, 18, 20, 24, 7, 11, 13, 19, 14, 21, 22, 25, 26, 28, 15, 23, 27, 29, 30, 31]; or when S=64, PW=[0, 1, 2, 4, 8, 16, 3, 32, 5, 6, 9, 10, 17, 12, 18, 33, 20, 34, 7, 24, 36, 11, 40, 13, 19, 14, 48, 21, 35, 22, 25, 37, 26, 38, 41, 28, 42, 15, 49, 44, 50, 23, 52, 27, 39, 56, 29, 43, 30, 45, 51, 46, 53, 54, 57, 58, 31, 60, 47, 55, 59, 61, 62, 63].

Implementation 2: sorting of code weight values

A code weight value sequence may be used for a puncturing or shortening operation on the complete groups and remaining bits in the groups after the bit groups are removed. A quantity of ones in a row of a polar coding matrix is a code weight of the row, and a code weight sorting sequence is obtained by sorting in ascending order of code weights and sorting in ascending order of sequence numbers for same code weights. A manner of using the code weight value sequence is similar to that of using the PW sorting sequence.

When a group quantity S has different values, a code weight sequence in ascending order is as follows:

when S=16, a code weight sequence=[0, 1, 2, 4, 8, 3, 5, 6, 9, 10, 12, 7, 11, 13, 14, 15];

when S=32, a code weight sequence=[0, 1, 2, 4, 8, 16, 3, 5, 6, 9, 10, 12, 17, 18, 20, 24, 7, 11, 13, 14, 19, 21, 22, 25, 26, 28, 15, 23, 27, 29, 30, 31]; or when S=64, a code weight sequence=[0, 1, 2, 4, 8, 16, 32, 3, 5, 6, 9, 10, 12, 17, 18, 20, 24, 33, 34, 36, 40, 48, 7, 11, 13, 14, 19, 21, 22, 25, 26, 28, 35, 37, 38, 41, 42, 44, 49, 50, 52, 56, 15, 23, 27, 29, 30, 39, 43, 45, 46, 51, 53, 54, 57, 58, 60, 31, 47, 55, 59, 61, 62, 63].

Implementation 3: a sequence constructed through Gaussian approximation (GA)÷density evolution (DE)

The sequence constructed through GA/DE may be used for a puncturing or shortening operation on the complete groups and remaining bits after the bit groups are removed. A reliability sorting sequence of polarized channels is calculated based on GA÷DE, and a manner of using the sequence is similar to that of using the PW sorting sequence.

when S=16, a sequence=[0, 1, 2, 4, 8, 3, 5, 6, 9, 10, 12, 7, 11, 13, 14, 15];

when S=32, a sequence=[0, 1, 2, 4, 8, 16, 3, 5, 6, 9, 10, 17, 12, 18, 20, 7, 24, 11, 13, 19, 14, 21, 22, 25, 26, 28, 15, 23, 27, 29, 30, 31]; or when S=64, a sequence=[0, 1, 2, 4, 8, 16, 3, 32, 5, 6, 9, 10, 17, 12, 18, 33, 20, 34, 7, 24, 36, 11, 40, 13, 48, 19, 14, 21, 35, 22, 25, 37, 26, 38, 28, 41, 42, 49, 44, 15, 23, 50, 52, 27, 39, 56, 29, 30, 43, 45, 51, 46, 53, 54, 57, 31, 58, 60, 47, 55, 59, 61, 62, 63].

Implementation 4: a natural order sequence

The natural order sequence may be used for a puncturing or shortening operation on the complete groups and remaining bits after the bit groups are removed. For example, the network device may determine the bit positions of the remaining N2 or L2 bits in natural order. L2 punctured bits may be selected in sequential order, e.g. the bits are punctured from the remaining bits after N1 bit groups are removed starting from the beginning of the bit sequence, and N2 shortened bits may be selected in reverse sequential order, e.g. the N2 bits are shortened from the remaining bits after N1 bit groups are removed starting from the end of the bit sequence.

It should be noted that reversed sequences of the sequences in the foregoing four implementations all meet the shortening operation. In addition, the PW sequence and the code weight sorting sequence are symmetrical to each other, in other words, sequence ($i$)=S−sequence ($S−i$).

In conclusion, in shortening and puncturing, the network device determines a sequence number of a bit that needs to be punctured in the N-bit sequence, or the network device determines a sequence number of a bit that needs to be shortened in the N-bit sequence. Optionally, in step 220, the network device does not perform a shortening or puncturing operation on the first encoded sequence whose length is N.

Optionally, before step 230 in which the network device performs the polar coding on the N-bit sequence, to obtain the first encoded sequence whose length is N, the rate matching method further includes: mapping, by the network device, one or more frozen bits into one or more polarized channels corresponding to bit sequence numbers determined by shortening or the puncturing, and mapping, by the network device, information bits into polarized channels with high reliabilities from remaining polarized channels after polarized channels corresponding to bit sequence numbers determined by shortening or the puncturing, and mapping one or more frozen bits into remaining polarized channels after the polarized channels corresponding to information bits in N polarized channels.

The frozen bit is a characteristic of the polar code, and a value of the polarized channel on which the frozen bit is located is pre-agreed on between a receiving end and a transmitting end. If rate matching uses the shortening mode, a Log Likelihood Ratio (LLR) of a bit position of a shortened bit during decoding is set to infinity. If rate matching uses the puncturing mode, a LLR of a bit position of a punctured bit during decoding is set to 0.

It should be noted that in step 230, the rate matching is performed on the first encoded sequence whose length is N, to obtain the second encoded sequence whose length is M, and this process may be implemented by a block interleaver. A specific implementation process is as follows: The first encoded sequence whose length is N is input into the block interleaver based on columns, where a column length of the block interleaver is N÷S, and a row length is S. The network device performs the rate matching operation based on the determined shortening or puncturing mode, and obtains, through reading, the second encoded sequence whose length is M, and an encoded sequence that is not read is punctured or shortened bits. When N<M, the block interleaver may also be used for repetition, to be specific, after the entire sequence is read in sequential order, reading is performed from the beginning until M bits are read.

It should be noted that a value of the code rate threshold is one of the following: 0, 1/4, 1/3, 2/5, 1/2, and 1. For example, the code rate threshold is 1/3. If the network device determines that the transmission code rate R is 1/2, the network device determines to use the shortening mode, and the network device determines a sequence number of a bit that is shortened in the bit sequence whose length is N. If the code rate threshold is 0, the network device determines to use the shortening mode. If the code rate threshold is 1, the network device determines to use the puncturing mode.

It should be noted that the receiving end obtains an LLR sequence after de-mapping and demodulating a radio signal, and the receiving end performs a rate de-matching and decoding operation on the LLR sequence. A process of the rate de-matching and decoding operation is specifically as follows: The receiving end obtains the data transmission code rate R and the code rate threshold by using control information or through pre-agreement, and the receiving end determines, by using the code rate R and the code rate threshold, whether the transmitting end uses a shortening rate matching mode or a puncturing rate matching mode. If the transmitting end uses the shortening mode, a LLR of a bit position of a shortened bit during decoding is set to infinity. If the transmitting end uses the puncturing mode for rate matching, a LLR of a bit position of a punctured bit during decoding is set to 0. By using the foregoing operations, the receive end can successfully complete a rate de-matching process and a decoding process.

Figure 10:
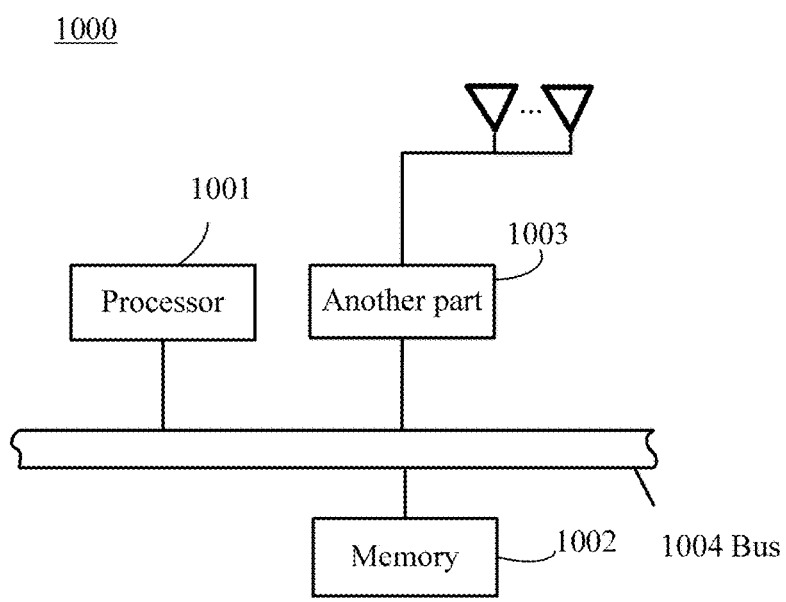
FIG. 10 is a structural diagram of a device according to an embodiment of this application.

As shown in FIG. 10, embodiments of this application further provide a communications device 1000. The communications device may be a base station, a terminal device, a DSP, an ASIC, or a chip that implements a related decoding function. The communications device 1000 further includes:

a memory 1002, configured to store a program, where the memory may be a random access memory (RAM), a read-only memory (ROM), or a flash memory, and the memory may be independently located in the communications device, or may be located in a processor 1001;

the processor 1001, configured to execute the program stored in the memory, and execute the foregoing rate matching method when the program is executed; and another part 1003, such as a transceiver or an input/output component.

The processor 1001, the memory 1002, and the another part 1003 may be connected by using a bus 1004.

It should be noted that a method executed by the processor 1001 is consistent with the foregoing content, and details are not described again.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedures or functions according to the embodiments of this application are all or partially generated. The computer may be a general-purpose computer, a dedicated computer, a computer network, or another programmable device. The computer instructions may be stored in a computer-readable storage medium or may be transmitted from one computer-readable storage medium to another computer-readable storage medium. For example, the computer instruction may be transmitted from one website, computer, server, or data center to another website, computer, server, or data center in a wired (for example, a coaxial cable, a fiber, or a digital subscriber line (DSL) or wireless (for example, infrared, radio, or microwave) manner. The computer-readable storage medium may be any usable medium accessible to the computer, or may be a data storage device such as a server or a data center integrating one or more usable media. The usable medium may be a magnetic medium (for example, a floppy disk, a hard disk, or a magnetic tape), an optical medium (for example, a digital video disk (DVD), a semi-conductor medium (for example, a solid-state disk (SSD), or the like.

What is claimed is:

1. A device in a communication network, comprising:
a processor, a memory storing program instructions for execution by the processor, and a transmitter;
wherein the processor, by executing the program instructions, is configured to:
obtain a bit sequence, wherein the bit sequence comprises K bits of information, and K is a positive integer;
encode the bit sequence to obtain a first encoded sequence, wherein the first encoded sequence comprises N bits, N is greater than or equal to K, and N is an integer power of 2;
block interleave the first encoded sequence, to obtain an interleaved bit sequence;
obtain a target code length M, wherein M is a positive integer smaller than N; and
when a transmission code rate K÷M is less than a code rate threshold, output a second bit sequence of M bits by puncturing (N−M) bits from beginning of the interleaved bit sequence; and
wherein the transmitter is configured to transmit the second bit sequence.

2. The device according to claim 1, wherein the processor, by executing the program instructions, is further configured to:
when the transmission code rate K÷M is greater than the code rate threshold, output a third bit sequence of M bits by shortening (N−M) bits from end of the interleaved bit sequence;
and wherein the transmitter is further configured to transmit the third bit sequence.

3. The device according to claim 1, wherein in block interleaving the first encoded sequence to obtain the interleaved bit sequence, the processor, by executing the program instructions, is configured to:
divide the first encoded sequence into a quantity S of bit groups that are of equal length, wherein the quantity S is a positive integer; and
interleave the first encoded sequence in bit groups.

4. The device according to claim 3, wherein S=32.

5. The device according to claim 3, wherein the second bit sequence is obtained by puncturing (N−M) bits from beginning of the interleaved bit sequence according to the following order:
removing a quantity L1 of bit groups from the S bit groups of the interleaved bit sequence starting from the beginning of the interleaved bit sequence, wherein L1=⌊(N−M)÷(N÷S)⌋; and
removing a quantity L2 of bits from a bit group at the beginning of the remaining S-L1 bit groups of the interleaved bit sequence, wherein L2=N−M−L1×(N÷S).

6. The device according to claim 2, wherein in block interleaving the first encoded sequence to obtain the interleaved bit sequence, the processor, by executing the program instructions, is configured to:
divide the first encoded sequence into a quantity S of bit groups that are of equal length, wherein the quantity S is a positive integer; and
interleave the first encoded sequence in bit groups;
and wherein the third bit sequence is obtained by shortening (N−M) bits from end of the interleaved bit sequence according to the following order:
removing a quantity N1 of bit groups from the S bit groups of the interleaved bit sequence starting from the end of the interleaved bit sequence, wherein N1=⌊(N−M)÷(N÷S)⌋; and
removing a quantity N2 of bits from a bit group at the end of the remaining S−N1 bit groups of the interleaved bit sequence, wherein N2=N−M−N1×(N÷S).

7. The device according to claim 1, wherein a value of the code rate threshold is any one of the following:
0, 1/4, 1/3, 2/5, 1/2, and 1.

8. The device according to claim 1, wherein the device is a base station or a user terminal.

9. An apparatus in a communication device, comprising:
a processor and a memory storing program instructions; wherein when the program instructions are executed by the processor, the apparatus is configured to:
obtain a bit sequence, wherein the bit sequence comprises K bits of information, and K is a positive integer;
encode the bit sequence to obtain a first encoded sequence, wherein the first encoded sequence comprises N bits, N is greater than or equal to K, and N is an integer power of 2;
block interleave the first encoded sequence, to obtain an interleaved bit sequence;
obtain a target code length M, wherein M is a positive integer smaller than N; and
when a transmission code rate K÷M is less than a code rate threshold, obtain a second bit sequence of M bits by puncturing (N−M) bits from beginning of the interleaved bit sequence; and
output the second bit sequence.

10. The apparatus according to claim 9, wherein the apparatus is further configured to:
when the transmission code rate K÷M is greater than the code rate threshold, obtain a third bit sequence of M bits by shortening (N−M) bits from end of the interleaved bit sequence; and
output the third bit sequence.

11. The apparatus according to claim 9, wherein in block interleaving the first encoded sequence to obtain the interleaved bit sequence, the apparatus is configured to:
divide the first encoded sequence into a quantity S of bit groups that are of equal length, wherein the quantity S is a positive integer; and
interleave the first encoded sequence in bit groups.

12. The apparatus according to claim 11, wherein S=32.

13. The apparatus according to claim 11, wherein the second bit sequence is obtained by puncturing (N−M) bits from beginning of the interleaved bit sequence according to the following order:
removing a quantity L1 of bit groups from the S bit groups of the interleaved bit sequence starting from the beginning of the interleaved bit sequence, wherein L1=⌊(N−M)÷(N÷S)⌋; and
removing a quantity L2 of bits from a bit group at the beginning of the remaining S-L1 bit groups of the interleaved bit sequence, wherein L2=N−M−L1×(N÷S).

14. The apparatus according to claim 10, wherein in block interleaving the first encoded sequence to obtain the interleaved bit sequence, the apparatus is configured to:
divide the first encoded sequence into a quantity S of bit groups that are of equal length, wherein the quantity S is a positive integer; and
interleave the first encoded sequence in bit groups;
and wherein the third bit sequence is obtained by shortening (N−M) bits from end of the interleaved bit sequence according to the following order:
removing a quantity N1 of bit groups from the S bit groups of the interleaved bit sequence starting from the end of the interleaved bit sequence, wherein N1=⌊(N−M)÷(N÷S)⌋; and
removing a quantity N2 of bits from a bit group at the end of the remaining S-N1 bit groups of the interleaved bit sequence, wherein N2=N−M−N1×(N÷S).

15. The apparatus according to claim 9, wherein a value of the code rate threshold is any one of the following:
0, 1/4, 1/3, 2/5, 1/2, and 1.

16. The apparatus according to claim 9, wherein the apparatus is a microchip, and the communication device is a base station or a user terminal.

17. A microchip, comprising one or more integrated circuits that are configured to:
obtain a bit sequence, wherein the bit sequence comprises K bits of information, and K is a positive integer;
encode the bit sequence to obtain a first encoded sequence, wherein the first encoded sequence comprises N bits, N is greater than or equal to K, and N is an integer power of 2;
block interleave the first encoded sequence, to obtain an interleaved bit sequence;
obtain a target code length M, wherein M is a positive integer smaller than N;
when a transmission code rate K÷M is less than a code rate threshold, obtain a second bit sequence of M bits by puncturing (N−M) bits from beginning of the interleaved bit sequence; and
output the second bit sequence.

18. The microchip according to claim 17, wherein the one or more integrated circuits are further configured to:

when the transmission code rate K÷M is greater than the code rate threshold, obtain a third bit sequence of M bits by shortening (N−M) bits from end of the interleaved bit sequence; and output the third bit sequence.

19. The microchip according to claim 17, wherein in block interleaving the first encoded sequence to obtain the interleaved bit sequence, the one or more integrated circuits are configured to:

divide the first encoded sequence into a quantity S of bit groups that are of equal length, wherein the quantity S is a positive integer; and interleave the first encoded sequence in bit groups.

20. The microchip according to claim 19, wherein S=32.

21. The microchip according to claim 19, wherein the second bit sequence is obtained by puncturing (N−M) bits from beginning of the interleaved bit sequence according to the following order:

removing a quantity L1 of bit groups from the S bit groups of the interleaved bit sequence starting from the beginning of the interleaved bit sequence, wherein L1=⌊(N−M)÷(N÷S)⌋; and removing a quantity L2 of bits from a bit group at the beginning of the remaining S-L1 bit groups of the interleaved bit sequence wherein L2=N−M−L1×(N÷S).

22. The microchip according to claim 18, wherein in block interleaving the first encoded sequence to obtain the interleaved bit sequence, the one or more integrated circuits that are configured to:

divide the first encoded sequence into a quantity S of bit groups that are of equal length, wherein the quantity S is a positive integer; and interleave the first encoded sequence in bit groups;

and wherein the third bit sequence is obtained by shortening (N−M) bits from end of the interleaved bit sequence according to the following order:

removing a quantity N1 of bit groups from the S bit groups of the interleaved bit sequence starting from the end of the interleaved bit sequence, wherein N1=⌊(N−M)÷(N÷S)⌋; and removing a quantity N2 of bits from a bit group at the end of the remaining S-N1 bit groups of the interleaved bit sequence, wherein N2=N−M−N1×(N÷S).

23. The microchip according to claim 17, wherein a value of the code rate threshold is any one of the following: 0, 1/4, 1/3, 2/5, 1/2, and 1.

24. A method for processing data in a wireless communication network, comprising:

obtaining, by an information processing device, a bit sequence, wherein the bit sequence comprises K bits of information, and K is a positive integer;

encoding, by the device, the bit sequence to obtain a first encoded sequence, wherein the first encoded sequence comprises N bits, N is greater than or equal to K, and N is an integer power of 2;

block interleaving, by the device, the first encoded sequence, to obtain an interleaved bit sequence;

obtaining, by the device, a target code length M, wherein M is a positive integer smaller than N; and when a transmission code rate K÷M is less than a code rate threshold, outputting, by the device, a second bit sequence of M bits by puncturing (N−M) bits from beginning of the interleaved bit sequence.

25. The method according to claim 24, further comprising:

when the transmission code rate K÷M is greater than the code rate threshold, outputting, by the device, a third bit sequence of M bits by shortening (N−M) bits from end of the interleaved bit sequence.

26. The method according to claim 23, wherein block interleaving the first encoded sequence to obtain the interleaved bit sequence comprises:

dividing, by the device, the first encoded sequence into a quantity S of bit groups that are of equal length, wherein the quantity S is a positive integer; and interleaving, by the device, the first encoded sequence in bit groups.

27. The method according to claim 26, wherein S=32.

28. The method according to claim 26, wherein the second bit sequence is obtained by puncturing (N−M) bits from beginning of the interleaved bit sequence according to the following order:

removing a quantity L1 of bit groups from the S bit groups of the interleaved bit sequence starting from the beginning of the interleaved bit sequence, wherein L1=⌊(N−M)÷(N÷S)⌋; and removing a quantity L2 of bits from a bit group at the beginning of the remaining S-L1bit groups of the interleaved bit sequence, wherein L2=N−M−L1×(N÷S).

29. The method according to claim 25, wherein blocking interleaving the first encoded sequence to obtain the interleaved bit sequence comprises:

dividing, by the device, the first encoded sequence into a quantity S of bit groups that are of equal length, wherein the quantity S is a positive integer; and interleaving, by the device, the first encoded sequence in bit groups;

and wherein the third bit sequence is obtained by removing (N−M) bits from end of the interleaved bit sequence according to the following order:

removing a quantity N1 of bit groups from the S bit groups of the interleaved bit sequence starting from the end of the interleaved bit sequence, wherein N1=⌊(N−M)÷(N÷S)⌋; and removing a quantity N2 of bits from a bit group at the end of the remaining S-N1 bit groups of the interleaved bit sequence, wherein N2=N−M−N1×(N÷S).

30. The method according to claim 24, wherein a value of the code rate threshold is any one of: 0, 1/4, 1/3, 2/5, 1/2, and 1.

* * * * *

UNITED STATES PATENT AND TRADEMARK OFFICE
CERTIFICATE OF CORRECTION

PATENT NO. : 10,567,994 B2
APPLICATION NO. : 16/561027
DATED : February 18, 2020
INVENTOR(S) : Gongzheng Zhang et al.

Page 1 of 1

It is certified that error appears in the above-identified patent and that said Letters Patent is hereby corrected as shown below:

In the Claims

In Column 13, Lines 26-29, Claim 22 is corrected to read:
22. The microchip according to claim 18, wherein in block interleaving the first encoded sequence to obtain the interleaved bit sequence, the one or more intergrated circuits are configured to: ......

In Column 14, Line 13, Claim 26 is corrected to read:
26. The method according to claim 24, wherein .....

Signed and Sealed this
Seventh Day of July, 2020

Andrei Iancu
*Director of the United States Patent and Trademark Office*